(12) United States Patent
Zand

(10) Patent No.: US 10,496,983 B2
(45) Date of Patent: Dec. 3, 2019

(54) WIRELESS TO MAGNETIC TRANSITION SMART CARD

(71) Applicant: Maap Technlogy Inc., Camarillo, CA (US)

(72) Inventor: Madjid Zand, Newbury Park, CA (US)

(73) Assignee: Maap Technology Inc., Camarillo, CA (US)

( * ) Notice: Subject to any disclaimer, the term of this patent is extended or adjusted under 35 U.S.C. 154(b) by 0 days.

(21) Appl. No.: 16/405,615

(22) Filed: May 7, 2019

(65) Prior Publication Data

US 2019/0266595 A1 Aug. 29, 2019

Related U.S. Application Data

(63) Continuation-in-part of application No. 14/596,024, filed on Jan. 13, 2015, now abandoned.

(60) Provisional application No. 62/123,106, filed on Nov. 7, 2014.

(51) Int. Cl.
*G06K 19/06* (2006.01)
*G06Q 20/34* (2012.01)
*G06K 7/08* (2006.01)

(52) U.S. Cl.
CPC .......... *G06Q 20/352* (2013.01); *G06K 7/087* (2013.01); *G06K 19/06196* (2013.01); *G06Q 20/349* (2013.01); *G06Q 20/356* (2013.01)

(58) Field of Classification Search
CPC .. G06Q 20/352; G06Q 20/349; G06Q 20/356; G06K 7/087; G06K 19/06196

USPC ......................................................... 235/492
See application file for complete search history.

(56) References Cited

U.S. PATENT DOCUMENTS

| | | | |
|---|---|---|---|
| 8,763,916 B1 | 7/2014 | Foo | |
| 8,827,153 B1 | 9/2014 | Rhoades | |
| 9,224,141 B1 | 12/2015 | Lamba | |
| 2006/0226217 A1* | 10/2006 | Narendra | G06Q 20/341 |
| | | | 235/380 |
| 2008/0169351 A1* | 7/2008 | Whiting | G06K 19/06187 |
| | | | 235/493 |
| 2009/0159663 A1 | 6/2009 | Mullen | |
| 2013/0320080 A1 | 12/2013 | Olson | |
| 2014/0006277 A1* | 1/2014 | Rao | G06Q 20/341 |
| | | | 705/41 |
| 2014/0052630 A1 | 2/2014 | Bona | |

(Continued)

*Primary Examiner* — Daniel A Hess
(74) *Attorney, Agent, or Firm* — SoCal IP Law Group LLP; Mark Andrew Goldstein

(57) ABSTRACT

A Transition Smart Card (TSC) is disclosed herein. The TSC receives data card information from credit and debit cards via a mobile phone. The TSC is used to present the financial card information card readers, such as magnetic card readers, for performing financial transactions. The TSC may connect with the mobile phone wirelessly or through a nest coupled to the mobile phone to receive financial card information for presentation to a magnetic card reader. The TSC may include a data display screen, a biometric device to authenticate a user, a dynamic broadcasting module for transmitting magnetic data, an ON/OFF switch to activate the card for use, and a rechargeable battery configured to be charged by proximity to another device such as a smart phone. The nest may include solar cells and other energy harvesting devices to obtain and provide electricity to the TSC.

20 Claims, 7 Drawing Sheets

(56) References Cited

U.S. PATENT DOCUMENTS

2015/0073983 A1 3/2015 Bartenstein
2018/0144115 A1* 5/2018 Wennemer ....... G06K 19/06206

* cited by examiner (c) 2019 Maap Technology Inc.

WIRELESS TO MAGNETIC TRANSITION SMART CARD

RELATED APPLICATION INFORMATION

This patent is a continuation-in-part and claims priority in part from prior-filed copending non-provisional patent application Ser. No. 14/596,024 filed Jan. 13, 2015 which claims the benefit of the filing date of U.S. Provisional Patent Application No. 62/123,106, filed Nov. 7, 2014, which is hereby expressly incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to financial smart cards. More specifically, this application relates to a smart card system for transition of data from a wireless source such as a mobile computing device to a magnetic card.

DETAILED DESCRIPTION

Systems, devices and methods are disclosed for a Transition Smart Card (TSC). The TSC is configured to be programmed by a mobile phone to receive financial card information, such information identifying credit and debit cards, and present the financial card information to financial card readers, such as magnetic card readers, for performing financial transactions. In some embodiments, the TSC may wirelessly connect with the mobile phone using Near Field Communication (NFC) or other wireless communications such as, for example, Bluetooth, to receive financial card information. The financial card information is formatted and stored on the TSC for presentation to magnetic card readers. The TSC transmits the financial card information to magnetic card readers upon detection by the reader. In some embodiments, the TSC may include a data display screen, a biometric device to authenticate a user, a dynamic broadcasting module for transmitting magnetic data, an ON/OFF switch to activate the card for use, and a rechargeable battery configured to be charged by proximity to another device such as a mobile phone.

With the ubiquity of Internet access and proliferation of smart devices such as mobile phones, there is an ever increasing demand for expanded services, functionality, online storage, sharing capabilities, and the like. One of the growing applications of Internet-capable smart devices is financial transactions at Points of Sale (POS). Digital wallets and other mobile payment systems have been appearing on the market with various levels of acceptance and success. Examples are Google Wallet™, Apple's Passbook™, Lemon Wallet™, Square Wallet™, Isis™, and the like. These entries into the mobile payment market compete with magnetic card systems that accept credit or debit cards with magnetic strips, which hold account information for financial transactions. Magnetic transaction systems are not as secure as the smart card versions which have encrypted memories and microprocessors that can perform authentication and authorization functions before they allow charges to be made to the user's charge account. However, magnetic systems are so entrenched in the market that they will continue to be used in mobile transactions for some time. Therefore, there is a need for a system that can bridge the gap between NFC-based cards and magnetic strip cards to enable a consumer to work with both forms of payment and payment systems without having to carry multiple charge cards.

Illustrative Operating Environment

Figure 1:
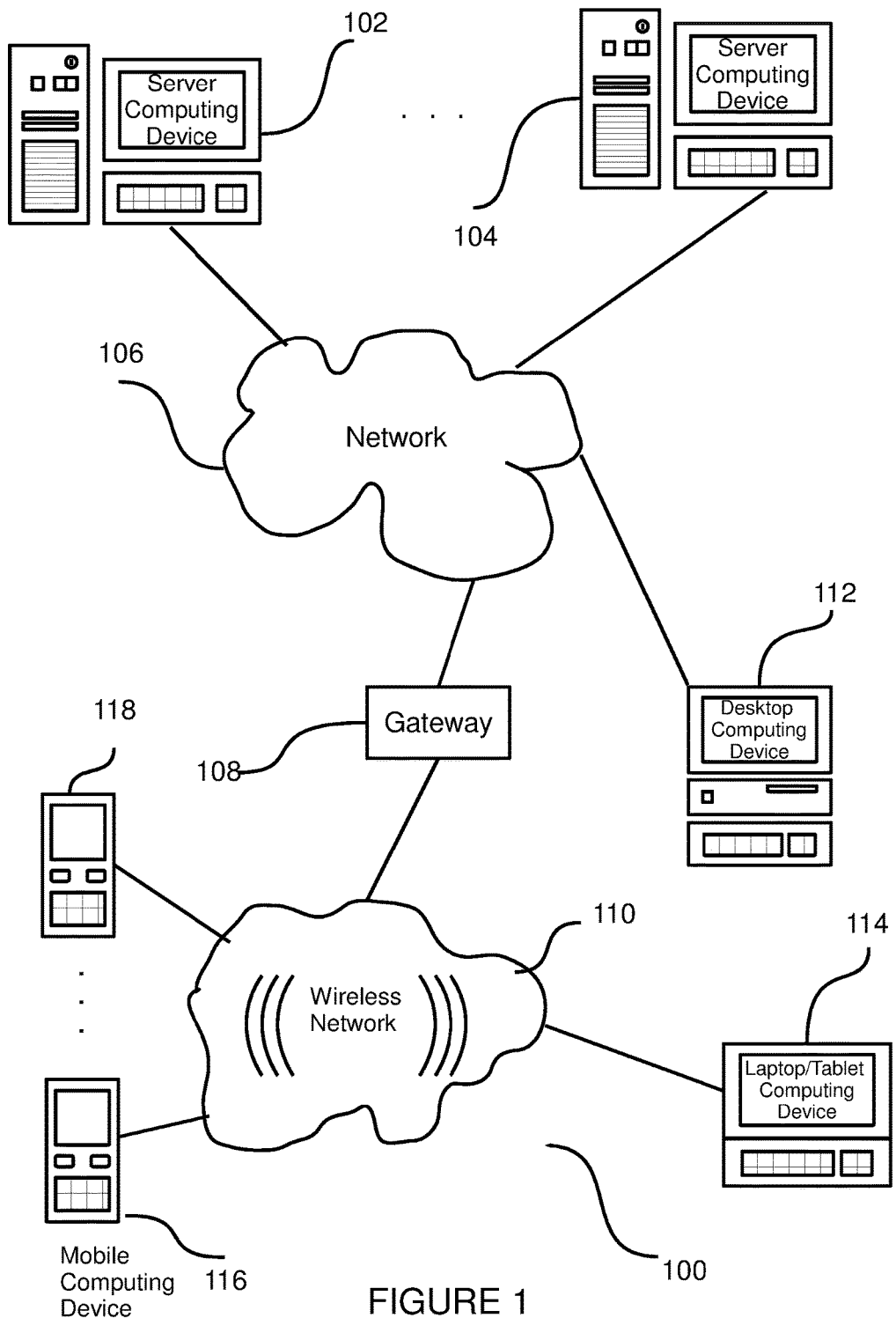
FIG. 1 is a block diagram of an example network computing environment wherein the wireless to magnetic transition smart card may be practiced.

FIG. 1 shows components of an illustrative environment in which the TSC disclosed herein may be practiced. Not all the shown components are required, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, client computing devices 112-118 include devices capable of receiving and sending a message over a network, such as wireless network 110, or the like. Such devices include portable devices such as, cellular telephones, smart phones, mobile phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 includes computing devices that connect using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 include a wide range of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphics, text, multimedia, or the like, employing web based languages, including a wireless application protocol messages (WAP), or the like. In one embodiment, the browser application may support one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the system disclosed herein is not limited to these message protocols, and other message protocols may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), $4^{th}$ (4) and $5^{th}$ (5G) generation radio access for cellular systems, WLAN, Wireless Router (WR) mesh, and the like. Access technologies such as 2G, 3G, 4G, 5G and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

In various embodiments, the arrangement of system 100 includes components that may be used in and constitute various networked architectures. Such architectures may include peer-to-peer, client-server, two-tier, three-tier, or other multi-tier (n-tier) architectures, MVC (Model-View-Controller), and MVP (Model-View-Presenter) architectures among others. Each of these are briefly described below.

Peer to peer architecture entails use of protocols, such as P2PP (Peer To Peer Protocol), for collaborative, often symmetrical, and independent communication and data transfer between peer client computers without the use of a central server or related protocols.

Client-server architectures includes one or more servers and a number of clients which connect and communicate with the servers via certain predetermined protocols. For example, a client computer connecting to a web server via a browser and related protocols, such as HTTP, may be an example of a client-server architecture. The client-server architecture may also be viewed as a 2-tier architecture.

Two-tier, three-tier, and generally, n-tier architectures are those which separate and isolate distinct functions from each other by the use of well-defined hardware and/or software boundaries. An example of the two-tier architecture is the client-server architecture as already mentioned. In a 2-tier architecture, the presentation layer (or tier), which provides user interface, is separated from the data layer (or tier), which provides data contents. Business logic, which processes the data may be distributed between the two tiers.

A three-tier architecture, goes one step farther than the 2-tier architecture, in that it also provides a logic tier between the presentation tier and data tier to handle application data processing and logic. Business applications often fall in and are implemented in this layer.

MVC (Model-View-Controller) is a conceptually many-to-many architecture where the model, the view, and the controller entities may communicate directly with each other. This is in contrast with the 3-tier architecture in which only adjacent layers may communicate directly.

MVP (Model-View-Presenter) is a modification of the MVC model, in which the presenter entity is analogous to the middle layer of the 3-tier architecture and includes the applications and logic.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
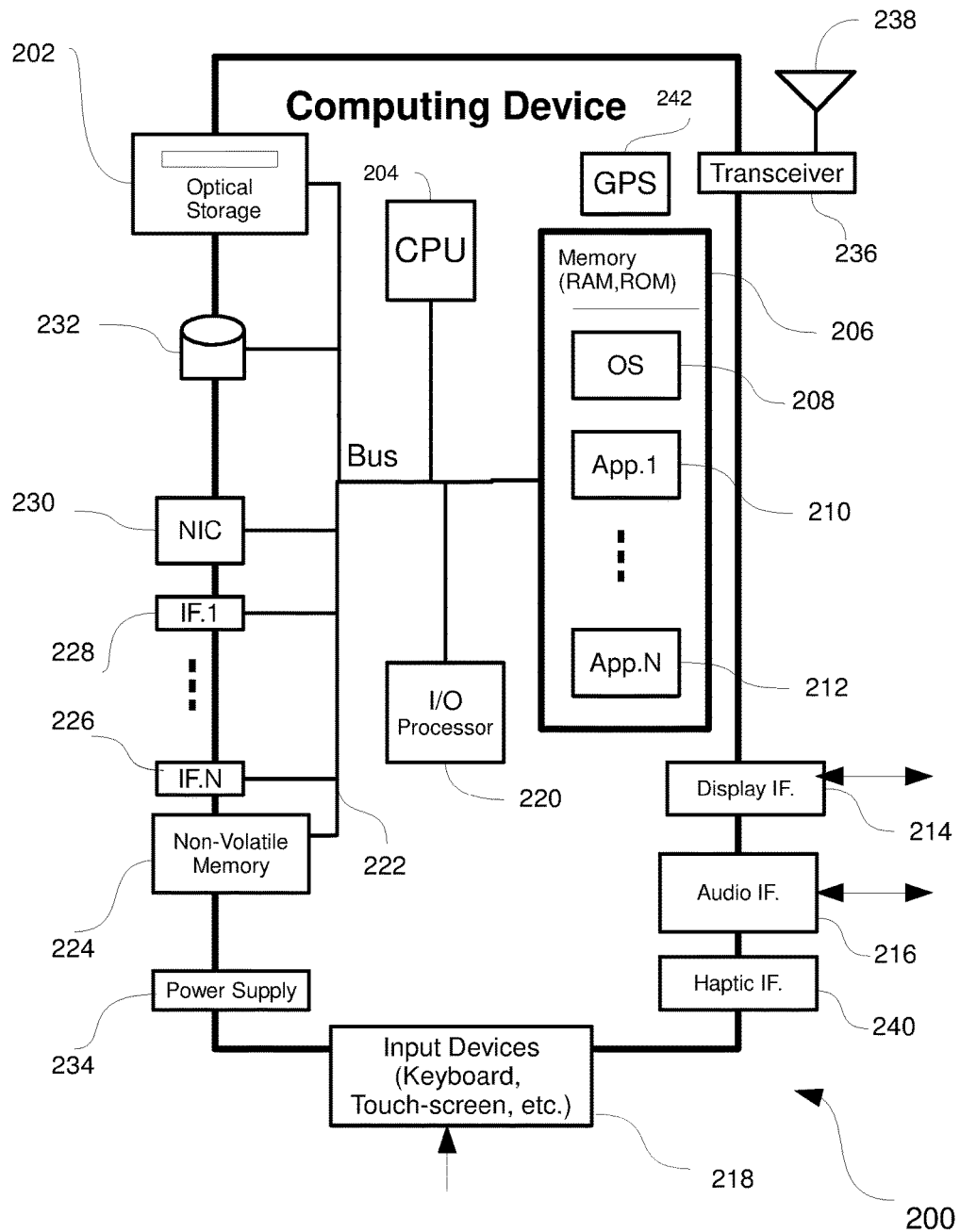
FIG. 2 is a black diagram of a computing device that may be used in the example network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs and/or software modules/components 210-212. Such software modules and components may be stand-alone application software or be components, such as DLL (Dynamic Link Library) of a bigger application software. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client-side and/or mobile communication operating system such as APPLE IOS and ANDROID operating systems. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
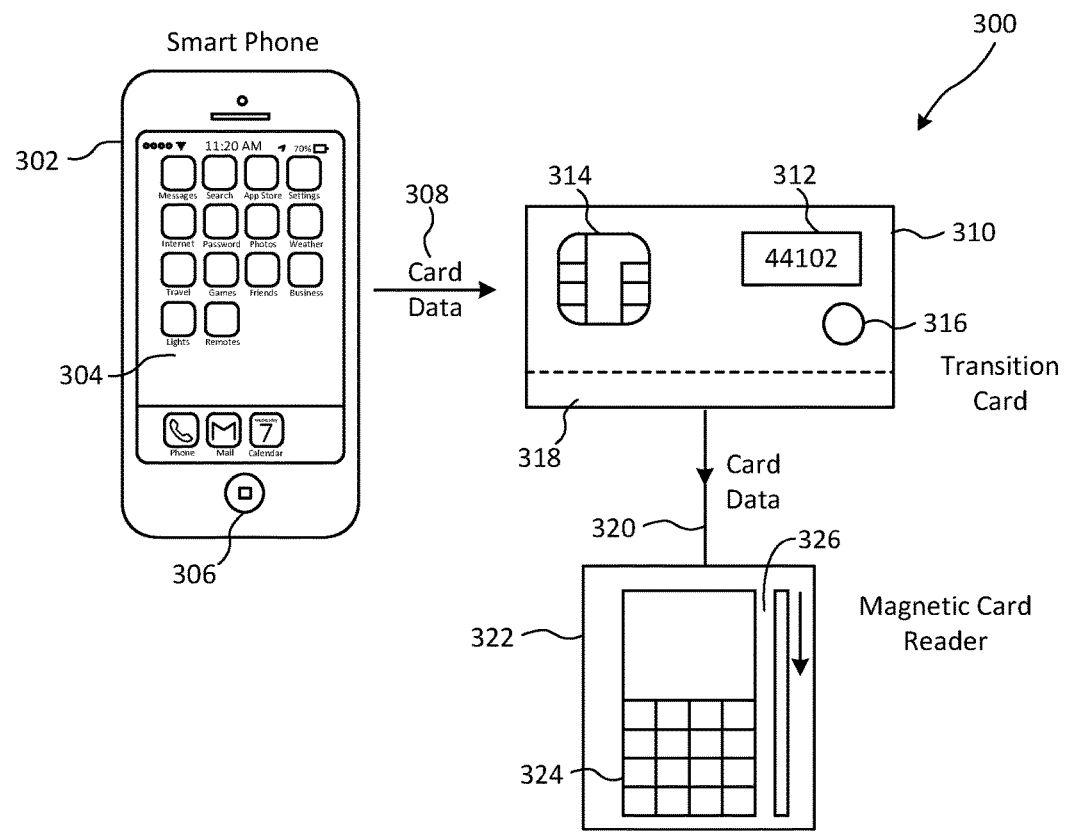
FIG. 3 is a block diagram of an example transaction environment in which data is transferred from a mobile phone to a transition smart card and then to a magnetic card reader.

FIG. 3 shows an example transaction environment in which data is transferred from a mobile phone to a transition smart card and then to a magnetic card reader. In various embodiments, the transaction system 300 includes a mobile phone 302 with screen and app (small software applications) icons 304, and hardware buttons 306, transmitting data 308 to a Transition Smart Card (TSC) 310. The transition card 310 may include a display screen 312, a processor 314, a switch 316, and a dynamic broadcast unit 318 used to magnetically broadcast data 320 to magnetic card reader 322 having user interface 324 and card slot 236.

In various embodiments, transaction system 300, and TSC 310 may be similar to the computing device of FIG. 2, in relevant portions, and implemented by a hardware and/or software system using one or more software components executing on one or more processors in the TSC, the mobile phone, and the magnetic card reader. In each of these components of the transaction system 300, one or more functions may be performed by each software module recorded on a storage medium such as volatile or non-volatile computer memory, and the like, or transmitted by various communication techniques using various network and/or communication protocols, as described above with respect to FIG. 1. For example one or more separate software modules or components may be used for each of the functions in each system component, such as a TSC detection module to detect the presence of the TSC by the mobile phone or magnetic card reader, a detection module of the smart card or the magnetic card reader by TSC, an encoding or converting data module for converting data from one form to another, a display controller module for controlling display on the TSC, a TSC programming module for programming the TSC, a TSC biometric processing module for processing biometric information input into TSC, a TSC sensor processing module to process data collected from the TSC sensors and switches, a TSC dynamic broadcast module to process and control data broadcasting from the dynamic broadcast unit, and the like described herein. Those skilled in the art will appreciate that one function may be implemented using multiple software modules or several functions may be implemented using one software module. With further reference to FIG. 2, these software modules are generally loaded into the memory module 206 of the computing device for execution.

In various embodiments, the mobile phone 302 may be used to program the TSC by downloading or transmitting financial card data, such as card account number, funds balance available, issuing bank information, name and address of authorized user, other information about the authorized user such as birth date, phone number, and other identifying information, to the TSC. The TSC may receive information about various types of cards such as credit cards, debit cards, identification cards, smart cards, and the like to emulate and/or represent such cards for the appropriate readers. The transmission of data 308 may be performed using various wireless systems and protocols such as Bluetooth, NFC, Wi-Fi, ZigBee, wired USB, or other standard or proprietary interfaces. In some embodiments, an app on the mobile phone may be used to read, download from a financial institution, or otherwise acquire card information from a financial smart card and transmit the same to the TSC. Such data may be reformatted for transmission or be converted to another format or layout by the app before transmission for use by the TSC.

In various embodiments, the TSC 310 may be programmed to represent one card at a time, while in other embodiments, the TSC may be programmed to hold information and represent more than one card at a time, which may be selected by the user at the point of use. In some embodiments one or more hardware buttons, switches, or sensors 316 may be available for performing various functions. These functions may include a power ON/OFF for power savings and/or control of the TSC, credit card selection for charging, TSC programming, TSC display control, and the like. In some embodiments, the mobile phone may detect the presence of the TSC in close proximity, for example, through NFC detection or by Bluetooth, and start the download or programming procedure for one or a predetermined number of cards more than one, to the TSC.

As an illustration, a mobile phone app may be launched by a user and loaded with one or more credit card information from a financial source, such as a bank website. The then TSC may be brought to close proximity of the mobile phone and turned ON using a hardware switch or button 316 on the TSC. At this point, the programming or downloading of card information begins. After the programming is completed, the app on the mobile phone and/or the screen 312 on TSC may show a visual indication to the user that the down load of information is completed successfully or has failed.

As another illustrative example, the user may use a switch/button on the TSC to indicate to the mobile phone app that TSC is ready for programming. After data for each card is downloaded and confirmed through visual indications, the user may press the button again to indicate it is ready for the next card data to be downloaded onto the TSC. This process continues until all data from the desired cards are downloaded to TSC.

During usage, in some embodiments, the user may use a combination of the hardware buttons 316 and screen 312 to select a desired financial card selection for charging. In the case of a single credit card programming onto TSC, the selection may be skipped.

In various embodiments, the display screen 312 may be black & white, while in other embodiments, it is color. In some embodiments the screen may have a single display line of several characters, while in other embodiments, the screen may have multiple lines configured to display text as well as basic graphics. In some embodiments, the screen may be composed of dot matrix to allow various arbitrary displays. The data displayed on the screen 312 may include text, numbers, text indicators like "Done," "Failed," "OK," "Continue," or symbolic indicators like a Stop sign, Exclamation mark ("!"), or other icons and symbols. The screen may also display arbitrary graphics or symbols limited by its dot-matrix capacity. In some embodiments, the display may be dynamic and change the information shown at various times, rates, based on different events, based on user interactions, and the like.

In various embodiments, TSC has a built-in rechargeable battery, further discussed below with respect to FIG. 6. The battery may be charged by holding the card in close proximity to a mobile phone configured to act as an inductive charger or other charging device that allows inductive/wireless charging of the battery.

Figure 6:
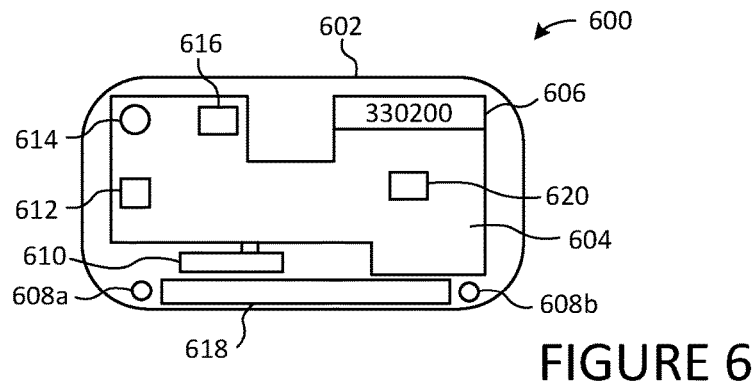
FIG. 6 is a bock diagram of an example transition smart card showing internal components of the transition smart card.
Figure 7A:
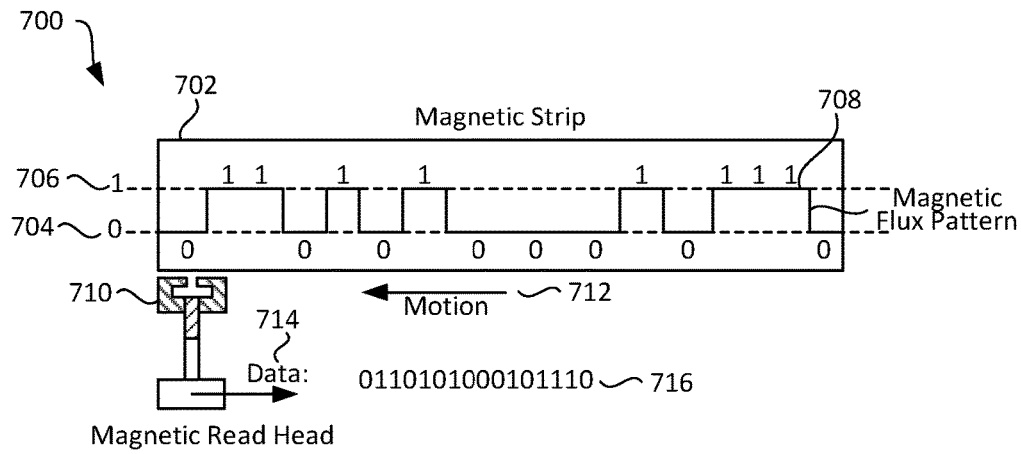
FIG. 7A is a block diagram and corresponding graph of an example magnetic strip of a transition smart card and a graph of corresponding signals generated by reading the magnetic strip.
Figure 7B:
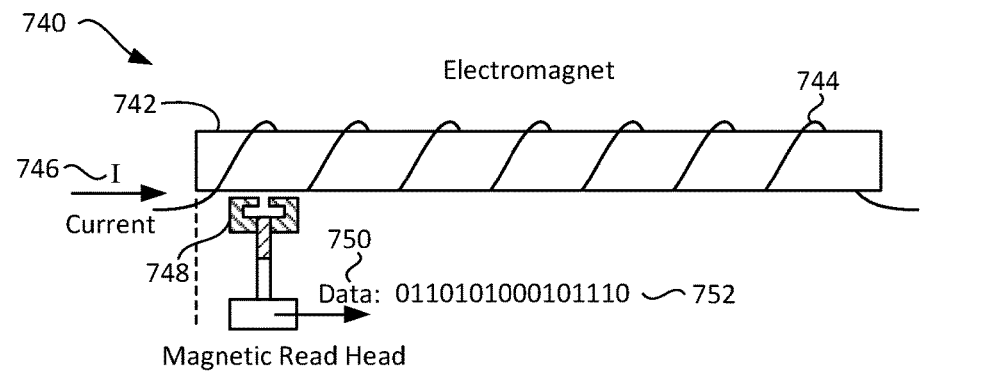
FIG. 7B is a block diagram and corresponding graph of an example electromagnet that reads the magnetic strip of a transition smart card and a graph of corresponding signals generated by reading the magnetic strip.

In various embodiments, the dynamic broadcast unit 318 is an electrical coil that can generate electromagnetic signals that are readable/detectable by a magnetic card reader 322, as further explained with respect to FIGS. 7A and 7B. In this application, the TSC may be used and behaves as a traditional credit/debit card with a magnetic strip, which is transparent to the magnetic card reader. In some embodiments, TSC may be used as an NFC card as well as a magnetic-strip card, depending on the reader. So, if the TSC is placed near an NFC reader, it will transmit data like other NFC cards, and if it is swiped in the slot 326 of the magnetic card reader, it will transmit the same data as would normally be recorded on a magnetic strip of a credit card to the reader. The user may interact with the magnetic card reader by using the keypad and display 324, for example, to enter a Personal Identification Number (PIN) for a debit card, approve a charge amount, and the like. In effect, the TSC may act as a transition card to In various embodiments, processor 314 is similar to the computing device of FIG. 2, but with more limited functions and components. The processor may have registers, memory, transmitter, receiver, antenna, and other components as necessary for receiving, processing, and transmitting data. The processor will be further described below with respect to FIGS. 5 and 6.

Figure 4A:
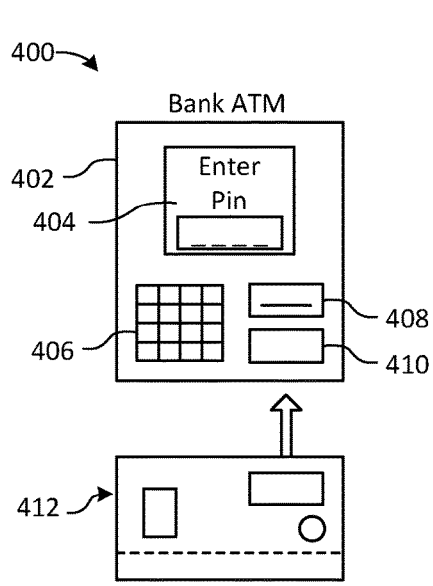
FIG. 4A is a block diagram of an example magnetic card reader application of the transition smart showing a bank ATM and point of sale terminals.
Figure 4B:
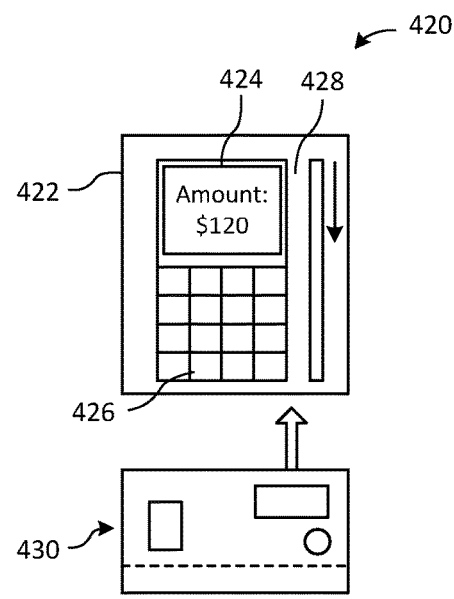
FIG. 4B is a block diagram of an example magnetic card reader application the transition smart showing a point of sale terminal.

FIGS. 4A-4B show example magnetic card reader applications and devices, such as bank ATM and point of sale terminals, in which the transition smart card may be used. With reference to FIG. 4A, in various embodiments, a bank Automatic Teller Machine (ATM) 400 may include a machine 402, a display screen 404 to display information to the user during a financial transaction such as cash withdrawal or check deposit, a keyboard 406 to receive input from the user such as a PIN number or amount of cash, a magnetic card slot 408 to receive a bank card 412 for authorization and charging, and an exchange port 410 to receive check and cash from and dispense cash and receipts to the user. In various embodiments, bank card 412 may the TSC emulating a magnetic strip card in a manner that is transparent to the ATM. That is, the ATM is unable to differentiate between the TSC and a traditional magnetic strip card.

With reference to FIG. 4B, a Point pf Sale (POS) terminal 420 may include a magnetic card reader device 422 including a screen 424, a keyboard 426, and a swiping slot 428 to swipe a bank card 430 for reading. In various embodiments, bank card 412 may the TSC emulating a magnetic strip card in a manner that is transparent to the POS terminal. In various embodiments, user may interact with the POS terminal in a similar manner to an ATM described above, in relevant portions.

Figure 5:
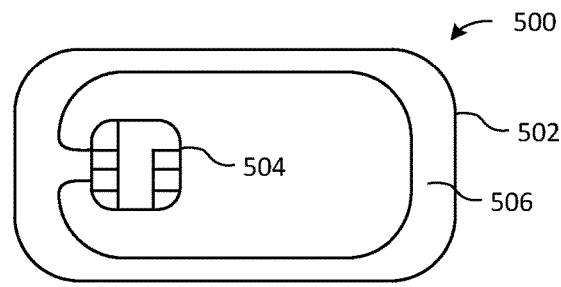
FIG. 5 is a block diagram of an example transition smart card having a processor and a wireless antenna.

FIG. 5 shows an example transition smart card having a processor and a wireless antenna. In various embodiments, the TSC 500 includes a card body or substrate 502, a processor 504 coupled with an antenna 506. In various embodiments, one or more of the TSC components shown here and in FIG. 6, may be exposed, while in other embodiments all components may be enclosed within laminated substrate 502 and not externally visible, unless needed for user interaction such as the display or user switches like the ON/OFF power switch. The antenna 506 is generally used to transmit and receive wireless signals such as NFC signals or other wireless protocols and systems. The antenna is coupled with the processor to allow the receipt and processing of signals under software/firmware control by the processor, or similarly, the transmission of signals once properly formatted and processed by the processor 504.

FIG. 6 shows an example transition smart card with internal components. In various embodiments, TSC 600 includes card substrate 602, circuit board 604, display screen 606, sensors 608a and 608b, rechargeable battery 610, transceiver 612, user switch 614, processor 616, and dynamic broadcaster unit 618.

In various embodiments, circuit board 604 is a flex circuit that can be softly bent without breaking, an FR-4 substrate for electronic components, which are glass-reinforced epoxy laminate sheets used in various applications, such as circuit board manufacturing, for their strength and flexibility.

In various embodiments, display screen 606 may be a single-line or multiple-line display, black & white or color display, and text or graphics display, as described in more detail with respect to FIG. 3 above.

In various embodiments, sensors 608a and 608b are resistive or capacitive switches that sense proximity to a magnetic field by a change in the value of their internal resistance or capacitance, respectively. An electrical current passing through the switch or a node voltage will vary when the resistance or capacitance of the switch changes, allowing detection of such changes by a circuit coupled with such switches. When, the card is swiped in a magnetic card reader, from either end, one of these switches are triggered that signify from which end of the card the swipe motion is beginning. In a magnetic strip the direction of motion of the card is important because it determines the order of the data read. The data read by a magnetic read head in one direction is in the reverse order of the same data read in the opposite direction. As described in further detail with respect to FIGS. 7A and 7B, unlike a magnetic strip card, the motion is actually immaterial when using a TSC.

In various embodiments, a rechargeable battery 610 may be charged by inductive methods wirelessly. Charging by induction is based on a magnetic field generated by a first electrical coil in a charger device, which magnetic field encloses a second electrical coil in a charging device that is in close physical proximity of the charger. The magnetic field so generated by the first coil induces a current in the second coil, which is then used to charge the battery. The current generated by this method depends on the strength of the magnetic field and the size of the coils and is generally small, on the order of a few milliamps, but adequate for charging small low-power devices. The battery is then used to run the processor, the display, the memory, the dynamic broadcaster, the sensors and switches, and other electrical devices and components in the TSC.

In various embodiments, transceiver 612 is a device that can send and receive wireless signals using the antenna 506 (FIG. 5). The electromagnetic signal received by the antenna is amplified, filtered, conditioned, normalized, decoded, digitized, and organized by the transceiver and/or the processor and/or other devices (such as Analog to Digital Converter—ADC) according to a predetermined format into digital bits and bytes ready for software processing and interpretation. The reverse process is performed for transmission of data from the TSC. That is, digital data are converted to analog signals and encoded according to various known formats for transmission via the antenna to other receivers. The transceiver may be designed for a particular protocol or system such as Bluetooth or NFC. In some embodiments, the transceiver or other devices involved in transmission and receipt of signals may be configurable or programmable to work with multiple communication protocols.

In various embodiments, switch 614 is a capacitive or resistive switch, similar to sensors 608a and 608b, to be used by the user for direct control of TSC, such as turning the card ON or OFF, provide input during TSC programming or use, controlling display mode of screen 606 (for example to display text only or graphics or control dimness, etc.), and the like. In some embodiments, multiple switches 614 may be deployed in TSC for easier and more control functions.

In various embodiments, processor 616 may be microcontroller with built-in memory, or a processor coupled with separate memory within TSC. The processor may be capable of executing small code segments stored within the card's memory and/or downloaded via an external programmer such as a mobile phone app. The executable code may perform various numerical calculations, signal processing, text manipulation, display data preparation, configuration and setup of TSC devices, or other computation.

In various embodiments, display controller 620 controls the screen 606 to properly display information, data, color, graphics, light intensity, scrolling up and down or sideways, and other similar or common display manipulations.

FIGS. 7A and 7B show examples of signals generated by reading a magnetic strip versus signals generated by reading an electromagnet, which signals can be identical. With reference to FIG. 7A, magnetic data reading system 700 includes magnetic strip 702 having magnetic data 708 recorded thereon with magnetic particles oriented in different magnetic directions (South or North poles of the magnetic particles) that represent two binary levels 704 and 706 for 0 and 1, respectively. The magnetic strip moves in a direction 712 in close physical proximity, with or without touching magnetic read-head 710. As the magnetic strip moves the particles having different magnetic poles create magnetic flux reversals near the magnetic read-head and induce corresponding electrical currents in the read-head. This way, the data recorded on the magnetic strip is detected by the varying current/voltage in the read-head and generated at the read-head output 714 as data bits 716, which are the same as the magnetic data 708. Graph 720 with data axis 722 having magnetic read-head data versus time axis 710 indicating passage of time during the motion 712, shows the output data 726 read by the read-head over a period of time. Those skilled in the art will appreciate that in any motion, points in time correspond with points in space traversed during the motion. So, each data point in time shown on the graph 720 correspond with a magnetic data point 708 on the magnetic strip 702.

Now with reference to FIG. 7B, an electromagnetic reading system 740 may be used to emulate the magnetic data reading system 700 of FIG. 7A. In various embodiments, the electromagnetic reading system includes a ferric-based metallic core 742 having conductive wire winding 744 wound around it to conduct electrical current 746 under processor control. The processor may use card data obtained by the TSC to modulate the current according to the bit pattern of the data. As the current passes through the conductive wire, a magnetic field is created near the magnetic read-head 748. By modulating the current 746, any magnetic field can be generated to emulate the flux reversals on a moving magnetic strip, as described with respect to FIG. 7A above. From this point on in the reading process, the magnetic read-head 748 is used to read magnetic data created by such modulated current and thus, magnetic field, in exactly the same manner as the read head 710 of FIG. 7A. A read-head output 750 generates data bits 752 identical to variations created by the modulated current results. So, if the current is modulated according to a desired data, such as magnetic data 708, then the same exact data are produced at the output of the read-head. Graph 760 depicts this process. The data axis 762 represents both the electromagnetic data produced by modulating current at the input gap (or read gap) of the read-head close to the electromagnet, and also the magnetic read-head data at the output 750 of the read-head. The time axis 764 represents the time passing during the read process. The data pattern 765 is identical to the data output 752 from the read-head.

In various embodiments, the use of the electromagnetic data generation generally is not in need of motion of the dynamic broadcast unit (similar to swiping a magnetic strip card) to generate the desired data for the read-head. Whether the electromagnetic component, such as the dynamic broadcaster 618 of FIG. 6, is moving with respect to the read-head or not, the read-head will receive the same electromagnetic signals and will read the same data. This is because the same magnetic field appears all along the length of the metallic core 742 when a current is passing through the wire 744. This is in contrast to the magnetic strip 702, which can generate different magnetic fields (during motion) at different points along its length due to different flux reversals encoded on it.

Hence, using the electromagnetic data generation, the data embedded on a magnetic strip can be dynamically generated by an electromagnet. This way the TSC may be used with magnetic data readers without having a magnetic strip.

Figure 8B:
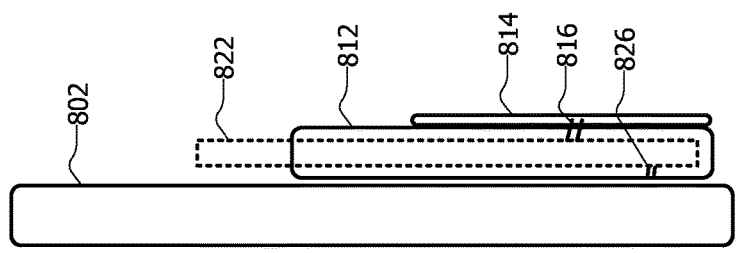
FIG. 8B is a block diagram of a transition smart card coupled with a mobile phone via a nest attached to the mobile phone in a second embodiment.
Figure 8A:
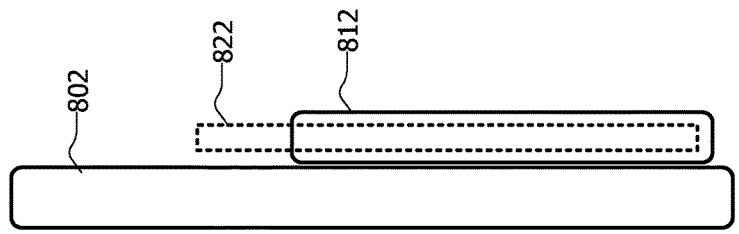
FIG. 8A is a block diagram of a transition smart card coupled with a mobile phone via a nest attached to the mobile phone in a first embodiment.

Referring now to FIGS. 8A and 8B, there are shown block diagram side views of a transition smart card 822 coupled with a mobile phone 802 via a nest 812 attached to the mobile phone. The nest 812 may be coupled with the mobile phone 802 by glue or other adhesive (not shown) or may be part of a slide on or clip on sleeve or protective case. In another embodiment, the nest 812 is integrally manufactured as part of the back of the mobile phone 802 itself. The nest 812 includes a cavity to receive the TSC 822. In this way, the nest may be generally rectangular with three sides that are complete or full and a fourth side that is open for receiving the TSC. The TSC 822 may snugly fit in the nest 812, such that the nest is configured to form-fit with the TSC 822. In one embodiment, as shown in FIG. 8B, the nest 812 includes metal connectors 826 in a location that coordinates with and touches, connects with and/contacts corresponding metal connectors on the TSC 822 when the TSC is inserted in the nest 812. In one embodiment, a chip plate may be used for the connection shown as 826. In this embodiment, the nest 812 has Bluetooth or NFC capability, such that the nest 812 can communicate information to and from the TSC 822 with the mobile phone 802. In various embodiments, the nest 812 may support energy harvesting techniques and include related technology such as light, acoustics, heat, RF, and motion sensors, receivers and/or detectors. In one embodiment, as shown in FIG. 8B, the nest 812 includes the capability of using light as source of energy harvesting. Specifically, solar cells and collectors/receivers 814 are mounted on an outside portion of the nest 812 such that the nest 812 can capture solar power from available ambient light. This energy harvesting version of the nest 812 includes electronics and circuitry necessary to convert ambient energy in to electricity and charge the TSC 822 when the TSC 822 is in the nest 812 and coupled electrically via connectors 816 of the nest 814 corresponding to electrical receivers or connectors on the TSC 822.

Figure 9:
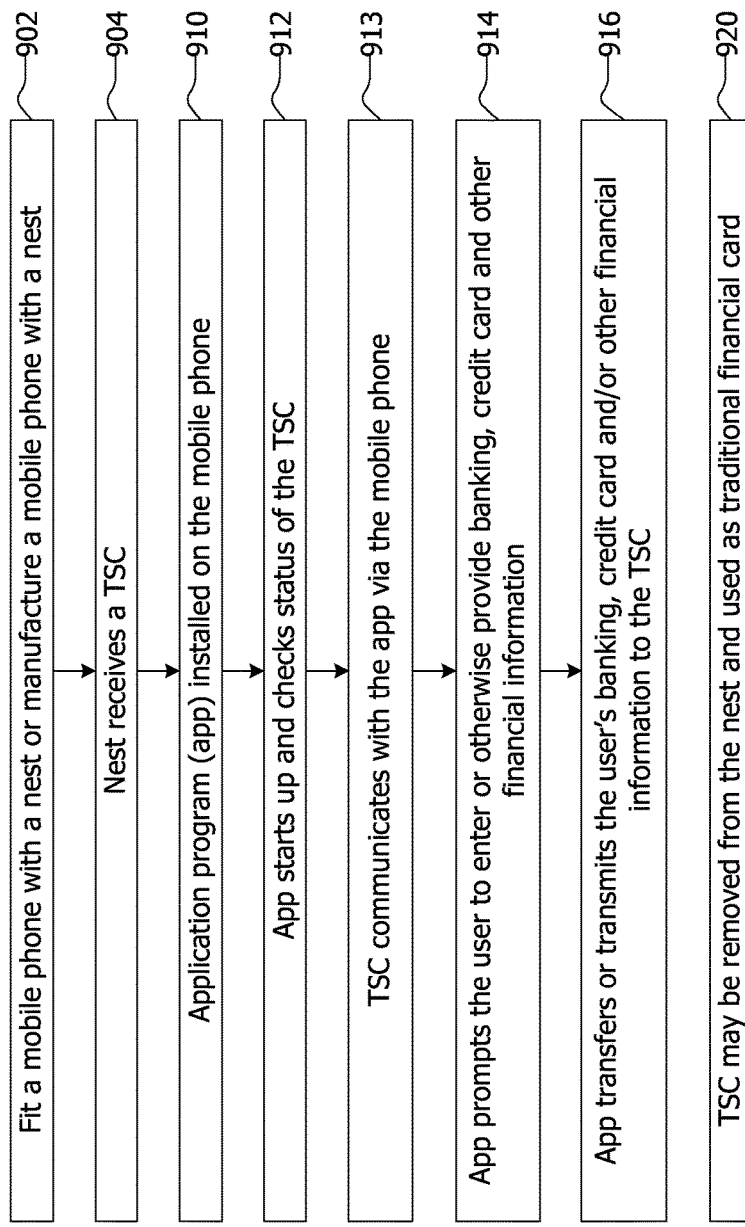
FIG. 9 is flow chart of a method of storing information on a transition smart card.

Referring now to FIG. 9, a flow chart of a method of storing information on a transition smart card is shown. This method involves a TSC having a configuration like that of TSC 822 included in nest 812 with mobile phone 802 described above regarding FIGS. 8A and 8B. As an initial or preliminary action, a mobile phone is fitted with or includes a nest, as shown in block 902. The nest may be coupled with the mobile phone by glue or other adhesive or may be part of a slide on or clip on sleeve or protective case. In one embodiment, the nest is integrally manufactured as part of the back of the mobile phone itself. Typically, a TSC is placed in the nest by a user. The nest receives a TSC, as shown in block 904. When a new, unused, unformatted TSC is inserted, banking, credit card and other financial information needs to be added to the TSC. In one embodiment, the TSC communicates with the mobile phone by NFC, Bluetooth or other wireless technique. In another embodiment, the TSC is coupled by metal physical connection with the nest and the nest communicates with the mobile phone by NFC, Bluetooth or other wireless technique. A user installs an application program or app on the mobile phone, as shown in block 910. The app is used to manage and configure the TSC with banking, credit card and other financial information. The app upon startup checks the status of the TSC, as shown in block 912. Upon startup the app communicates via the mobile phone with the TSC, as shown in block 913 wirelessly using Bluetooth, NFC, ZigBee or other wireless communication protocol and technique. When the TSC is empty or when the user selects to reformat a TSC, the app prompts the user to enter or otherwise provide banking, credit card and other financial information, as shown in block 914. The app may do this by using test, text boxes, graphics and other user interface elements to direct the user to manually enter or to use the mobile phone to scan in banking, credit card and other financial information. The banking, credit card and other financial information includes account number, security code, expiration date, billing address, name on the card, and other pertinent information needed for financial transactions such as purchases. After the app obtains and/or captures the user's banking, credit card and other financial information, the app transfers or transmits the user's banking, credit card and other financial information to the TSC, as shown in block 916. The TSC is now ready to be used as a regular financial (credit or debit) card. The TSC may be removed by the user from the nest and used in the same manner as a traditional magnetic stripe financial card, as described above, as shown in block 920.

It will be understood that each step in the procedures and methods describe herein, and combinations of steps, can be implemented by computer program instructions. These program instructions may be provided to a processor to produce a machine, such that the instructions, which execute on the processor, create means for implementing the actions specified herein. The computer program instructions may be executed by a processor to cause a series of operational steps to be performed by the processor to produce a computer implemented process such that the instructions, which execute on the processor to provide steps for implementing the actions specified herein. The computer program instructions may also cause at least some of the operational steps described to be performed in parallel. Moreover, some of the steps may also be performed across more than one processor, such as might arise in a multi-processor computer system. In addition, one or more steps or combinations of steps described may also be performed concurrently with other steps or combinations of steps, or even in a different sequence than illustrated without departing from the scope or spirit of the disclosure.

Accordingly, each step or combinations of steps described, can be implemented by special purpose hardware based systems which perform the specified actions or steps, or combinations of special purpose hardware and computer instructions.

It will be further understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A Transition Smart Card (TSC), comprising:
a body having two ends operable to swipe the TSC along a read-slot of magnetic card readers;
a processor, a memory module, a display screen, a biometric sensor, and an antenna to transmit and receive wireless signals, each embedded in the body, wherein the biometric sensor is configured to authenticate a user of the TSC;
the TSC further including metal connectors to touch corresponding metal connectors on a nest coupled to a mobile phone;
software on the TSC configured to wirelessly download from the mobile phone to the TSC through the nest data card information originating from at least one data card and stored on the mobile phone;
a dynamic broadcaster embedded in the body, coupled with the processor, and configured to generate magnetic fields between the two ends based on the information from the data card, the magnetic fields configured to be read by magnetic card reader; and
two proximity direction sensors deployed one at each of the two ends of the TSC body operable to detect a direction of swipe of the TSC along the read-slot of magnetic card readers.

2. The TSC of claim 1 wherein the antenna is configured to transmit and receive wireless data via Near Field Communications (NFC).

3. The TSC of claim 1 wherein the display screen is configured to display information to a user.

4. The TSC of claim 1 wherein the processor is coupled to the memory module which is configured to store the data card information.

5. The TSC of claim 1 wherein the processor is configured to receive information about the data card from the mobile phone through the nest.

6. The TSC of claim 1 wherein the data card is at least one of a credit card, a debit card, and an identification card.

7. The TSC of claim 1 wherein the TSC further includes an ON/OFF button to turn the TSC ON or OFF.

8. The TSC of claim 1 wherein the processor and other electrical components of the TSC are powered by a wirelessly rechargeable battery embedded in the body.

9. The TSC of claim 1 wherein the TSC includes at least one hardware button configured such that the information from the data card is user-selectable via the hardware button.

10. A data card system comprising:
a mobile phone having a software application stored thereon that is configured to enable wireless transmission of information obtained from a plurality of data cards to a Transaction Smart Card (TSC);
a TSC including a processor, a memory module, a display screen, a dynamic broadcast unit, a biometric sensor, and an antenna to transmit and receive wireless signals, each included in a body of the TSC, wherein the biometric sensor is configured to authenticate a user of the TSC;

a mobile phone having a nest coupled thereto;

software on the TSC configured to wirelessly download from the mobile phone via a connection with the nest information originating from the plurality of data cards;

the TSC configured to transmit the information as magnetic fields readable by a magnetic card reader, wherein the TSC further includes two proximity direction sensors deployed one at each of two ends of the TSC operable to detect a direction of swipe of the TSC along a read-slot of the magnetic card reader.

11. The system of claim 10 wherein the mobile phone uses Near Field Communication (NFC) to transmit the information to the TSC through the nest.

12. The system of claim 10 wherein the TSC further includes a wirelessly rechargeable battery.

13. The system of claim 10 wherein the information comprises financial information including user name and account information.

14. The system of claim 10 wherein the data cards include at least one of credit cards, debit cards, and identification cards.

15. The system of claim 10 wherein the TSC includes at least one hardware button configured such that the information from the plurality of data cards is user-selectable via the hardware button.

16. A method of using Transition Smart Card (TSC) comprising:

wirelessly transmitting information originating from a data card from a mobile phone onto the TSC via a nest coupled with the mobile phone when the TSC is located in the nest;

the nest obtaining electrical charge from solar cells included in the nest;

charging a wirelessly rechargeable battery included with the TSC when the TSC is in the nest;

authenticating a user of the TSC via a biometric device and a biometric processing module included with the TSC;

using two proximity direction sensors deployed one at each of two ends of the TSC operable to detect a direction of swipe of the TSC along a read-slot of a magnetic card reader;

processing the information by a processor on the TSC to generate a bit pattern usable to modulate an electrical current based on the determined direction of swipe; and using the electrical current to generate magnetic fields readable by the magnetic card reader.

17. The method of claim 16 further comprising controlling the transmitting of the information to the TSC using hardware switches on the TSC.

18. The method of claim 16 wherein the transmitting of the information from the mobile phone to the TSC via the nest comprises using Near Field Communication (NFC).

19. The method of claim 16 wherein the transmitting of the information from the mobile phone to the TSC includes receiving selection of information from the hardware button in conjunction with a display screen on the TSC to control a process of downloading the information from the plurality of cards.

20. The method of claim 16 wherein using the electrical current to generate magnetic fields comprises generating the magnetic fields along a length of a dynamic broadcast unit that is configured to be read by a magnetic card reader regardless of a motion of the TSC with respect to the magnetic card reader.

* * * * *